(Model.)
3 Sheets—Sheet 1.
I. BURKHOLDER.
GATE.
No. 336,288. Patented Feb. 16, 1886.
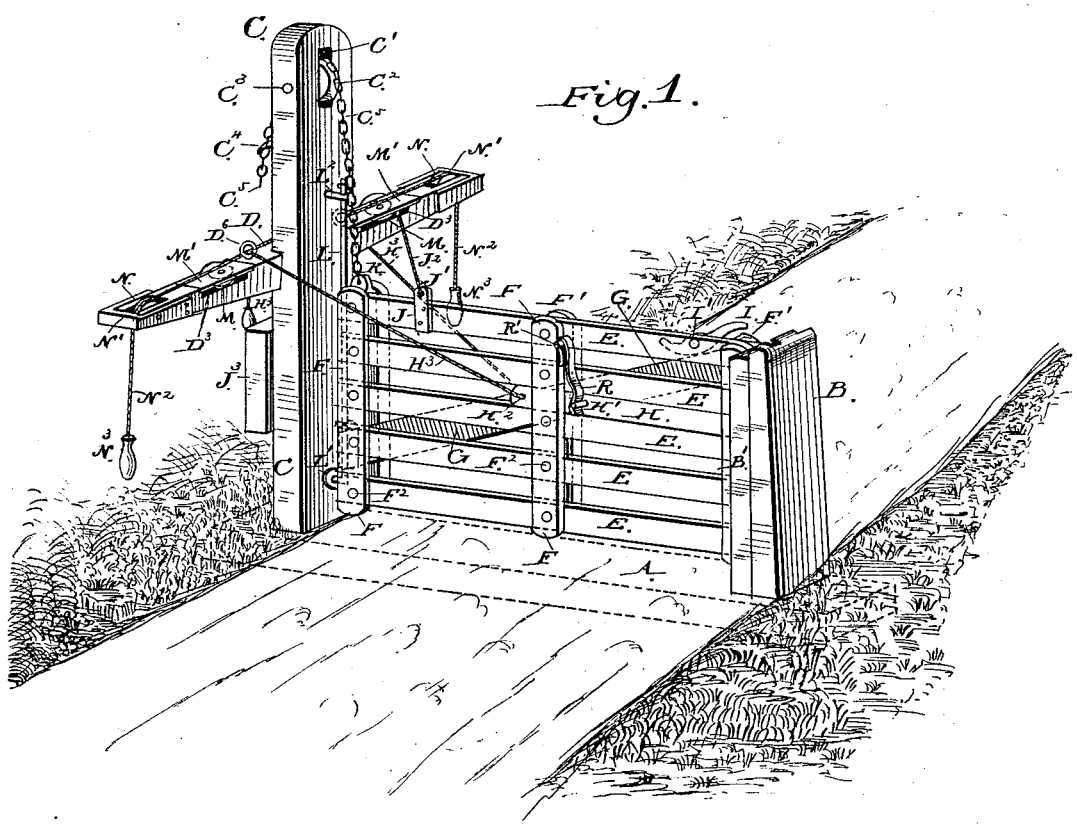
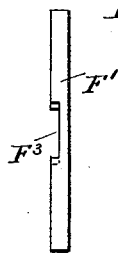
WITNESSES
P. Walter Fowler
M. E. Cohen
INVENTOR
Isaac Burkholder,
by Thomas P. Kinsey
Attorney (Model.)
3 Sheets—Sheet 2.
I. BURKHOLDER.
GATE.
No. 336,288.  Patented Feb. 16, 1886.
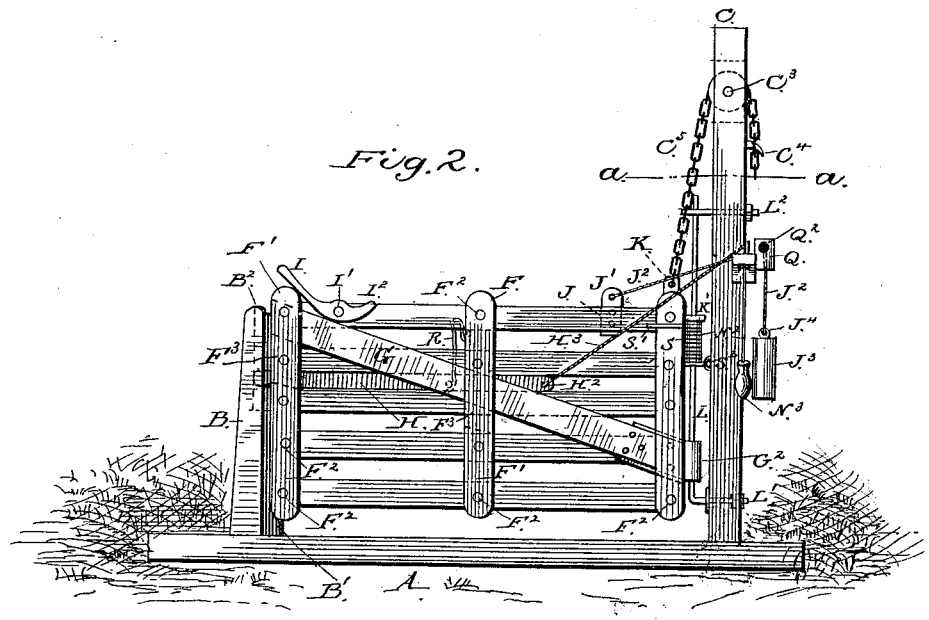
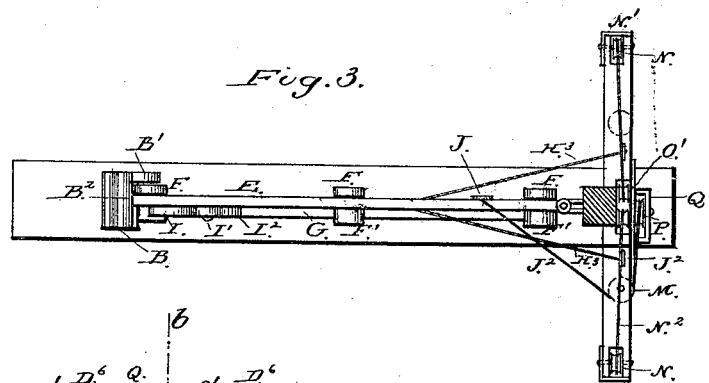
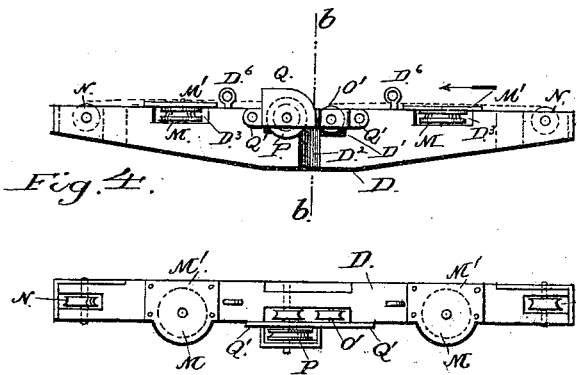
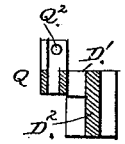
WITNESSES
T. Walter Fowler
M. E. Cohen
INVENTOR
Isaac Burkholder,
by Thomas P. Kinsey
Attorney
N. PETERS, Photo-Lithographer, Washington, D. C.

(Model.)

3 Sheets—Sheet 3.

I. BURKHOLDER.
GATE.

No. 336,288.  Patented Feb. 16, 1886.

WITNESSES
T. Walter Fowler
M. E. Cohen

INVENTOR
Isaac Burkholder
by Thomas D. Kinsey
Attorney

United States Patent Office.

ISAAC BURKHOLDER, OF FARMERSVILLE, PENNSYLVANIA.

GATE.

SPECIFICATION forming part of Letters Patent No. 336,288, dated February 16, 1886.

Application filed May 25, 1885. Serial No. 166,583. (Model.)

*To all whom it may concern:*

Be it known that I, ISAAC BURKHOLDER, a citizen of the United States, residing at Farmersville, county of Lancaster, State of Pennsylvania, have invented a new and useful Improvement in Gates, of which the following is a specification.

This improvement relates more particularly to a semi-automatic gate for the use of farmers and others.

The object of the improvement is to furnish a gate of a wide range of adaptation, that is simple in its construction, and taking into consideration its flexibility is inexpensive to construct.

The drawings forming a part of this specification disclose very fully the aim and object of the improvement, in all of which like figures of reference indicate like parts throughout.

Figure 6:
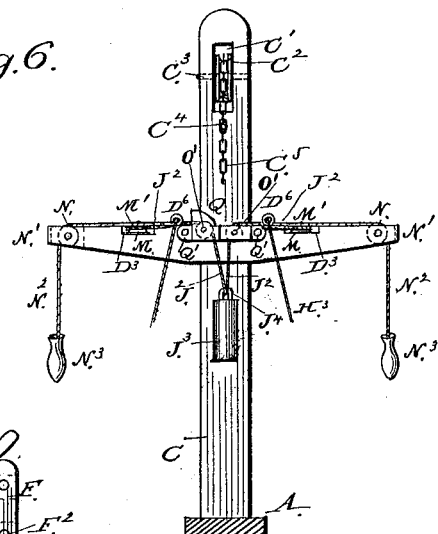
Figure 7:
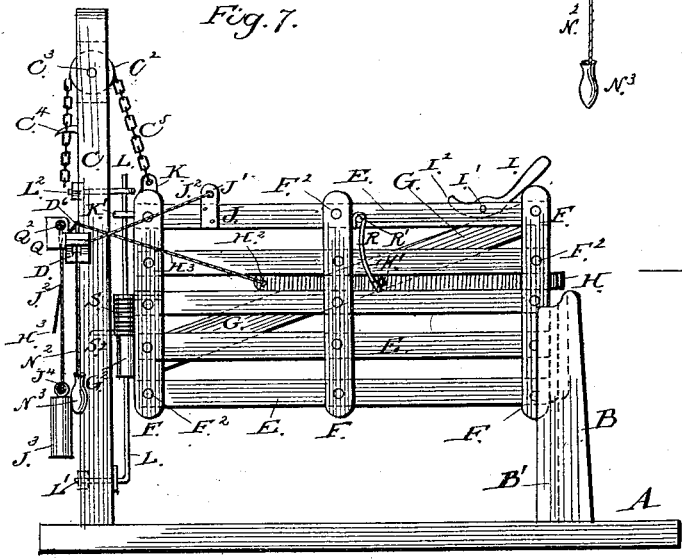
Figure 9:
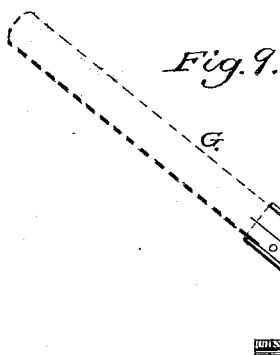
Figure 8:
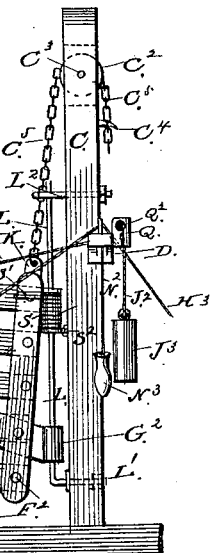

Figure 1, Sheet 1, represents in perspective the improvement applied to a farm-gate. Fig. 2, Sheet 2, is a front elevation of the gate. Fig. 3, Sheet 2, represents a plan of the gate with the hinge-post in section on the line $a\ a$ of Fig. 2. Fig. 4, Sheet 2, is an enlarged elevation and plan of the cross-arm, showing the arrangement of the sheaves and construction of the sheave-box; Fig. 5, Sheet 2, a cross-section of the arm and sheave-box on the line $b\ b$ of the elevation. Fig. 6, Sheet 3, is an end elevation of the hinge-post and cross-arm. Fig. 7, Sheet 3, represents the gate raised to clear a pile of snow or other obstruction. Fig. 8, Sheet 3, shows the gate canted to allow the passage of small animals beneath the gate, while larger animals are kept out of the field. Fig. 9, Sheet 3, represents the heel-plate of the gate-brace in elevation and horizontal section, the brace being shown in dotted lines. Fig. 10, Sheet 1, is an end view of the middle notched upright of the gate.

A represents a ground-sill, which may be dispensed with, the posts being planted in the usual manner.

B represents the latch-post; B', a rabbet-strip, against which the gate rests. When it is desirable to have the gate swing in the opposite direction to that shown, the position of the strip B' is transposed.

$B^2$ is a latch or bolt keeper groove made in the post for about one-half of its upper length as a pocket for the latch or sliding bolt.

C represents the hinge-post of about twice the height of the latch-post, provided at its upper end with a mortise, C', in which a sheave, $C^2$, is pivoted on a pin, $C^3$. At the rear of the post a bent pin, $C^4$, is provided, upon which the chain, $C^5$, is hooked, the opposite end of the chain being connected with an eye-plate, K, at the heel-post of the gate. A cross-arm tapering each way from the post is partially notched out and interlocked with the post in a notch cut therein about one foot above the top of the gate, and is provided with vertical and horizontal sheaves, a description of which will be given further on.

The gate is constructed of the usual fence-boards. The rails E are secured by bolts $F^2$ between uprights F of the same thickness as the rails on one side and uprights F' of double the thickness upon the opposite side. The double-thickness uprights F' are notched out at $F^3$ upon their inner faces, to receive the brace G and permit a certain amount of play of the gate upon the same. The brace G is provided with a heel-plate casting, G', having side ledges, within which the brace is seated, and to which it is secured, and a sleeve, $G^2$, the weight of the gate being carried by said brace as it swings to or fro and slides upon the long hinge-rod L, which is bent at its lower end, and provided with a collar, threaded end, and nut L'. At the upper end it is loosely held by a hook-bolt, $L^2$. An eye-piece or hinge, K', swinging upon the hinge-rod L, and a chain eye-plate, K, are both connected with the heel-post of the gate upon opposite sides of the rail E and uprights F F' by a bolt. A latch or bolt, H, slides freely between the rails E, uprights F F', and brace G, and when the gate is closed has its outer end pressed within the keeper-groove $B^2$ by the spring R, secured by pin R' to the upper rail, and pressing with its free end against a pin, H', secured in the bolt H. An eye, $H^2$, at the rear end of the bolt H is connected to cords $H^3$, which are passed through eyes $D^6$ on the cross-arm D, each side of the hinge-post C, and by means of these cords the bolt may be withdrawn from the keeper-groove from either side of the fence. A plate, J, provided with an eye, J', is secured to the top rail near the heel-post, and serves as the point of attachment for the cord J², by means of which the gate is swung upon the hinge-rod L.

When the gate is to operate in the direction shown, the cord J² is passed from the eye J' over the sheave M, lying in a notch, D³, of the cross-arm and covered by a plate, M', in which the sheave is pivoted. The cord passes from the sheave M through the opening Q² in the sheave-box Q, over the sheave P, and down to the eye J⁴ of the counter-balance J³, in which it is secured. On pulling the cord H³, thereby releasing the bolt H, the counter-weight will descend and open the gate.

If it is desired to open the gate in the direction opposite to that shown, the rabbet-strip B' being left off of the post B, the cord J² is run on the opposite side of the hinge-post to a duplicate sheave, M, placed in a duplicate notch, D³, and carried over a second sheave, P, to be placed similarly to the first arrangement shown. The sheave-box Q, having its casing lengthened out to admit of the duplicate arrangement, and connected with the counter-weight J³, either cord H³ being pulled, will, as before, release the bolt, and the descent of the weight J³ will open the gate in the desired direction.

To close the gate, cords N², terminating in hand-holds N³, pass upward over sheaves N, pivoted in the bifurcated ends N' of the cross-arm D, over to sheaves O', and downward to the counter-weight J³, with which they connect. By pulling upon either of the hand-holds N³ the weight J³ is raised and the gate is free to swing back in place. By hanging the long hinge-rod L out of plumb in the proper direction, the gate, on being freed from the weight, would return into position; but to give positive closure I prefer to introduce a spiral spring, S, or its equivalent. This spring is provided with an arm, S', bent so as to project from the spring and lap upon the heel-post upon the side to which force is necessarily applied to close the gate. The spring is mounted upon the hinge-rod, and its end S² is secured to the hinge-post C, so that the gate in opening tightens up the coil, and the resilience of the spring on the relief of the gate from the weight-tension instantly acts to close the gate. The face of the post B on the closing side is beveled, so that the bolt H, on striking it, will be automatically slid back until the keeper-groove B² is reached, when the spring R, acting upon the bolt, will shove it in place therein, thus securing the gate.

To save shoveling snow out of reach of the sweep of the gate, I arrange it to be raised any reasonable distance above its normal position by means of the chain-eye K, chain C⁵, and sheave C². A pin, C⁴, in the rear face of the post, over which the chain-links are hooked, serves to retain the gate at the point to which it is adjusted, as shown in Fig. 7. As the gate rises, the heel-post slides past the arm S' of the spring S, and the same thing occurs as the gate descends to its normal position.

It is also considered desirable to be able to cant up one end of a farm-gate, for the purpose of admitting the passage of small rooting animals within the field, while barring out the larger grazing animals. I provide for this, as shown in Fig. 8, by the introduction of a diagonal brace, G, provided with a heel-plate, G', sleeve G², and ledges within which the brace is retained. The gate is free to rise and fall upon this brace by the uprights F' being notched to permit the same, and the angle at which the gate shall be thrown up is regulated by a lever, I, fulcrumed at I', and having a cam-shaped end, I², resting upon the upper edge of the brace. When the gate hangs parallel with the ground-sill A, the handle I rests upon the top of the upright F', and as it is drawn backward the cam-shaped end I² depresses the brace and elevates the latch-post corner of the gate. Holes may be bored in the rails above the brace and a pin inserted to hold the gate in position; but I prefer the mode shown and described, as being more readily applied, and having no loose parts in connection therewith.

Having shown and described my improvement and recited its use and advantages, I desire to secure by Letters Patent the following claims thereon:

1. The combination of the brace G, provided with the heel-plate G', having sleeve G² at its lower end, a gate provided with uprights F', having notches F³ therein, in which the said brace may slide, the lever I, having a cam-shaped end for raising one end of the gate, and the hinge-rod L, securely attached to the main gate-post and forming a pivot for the said gate, substantially as and for the purpose set forth.

2. The combination of the main gate-post C, a gate hinged to the said main gate-post and provided with the sliding bolt H and spring R, the cross-arm D, provided with the eyes D⁶ and the sheaves O' and N, the cords H³, for drawing back the spring-bolt, the weight J³, provided with the cord J², passing over the pulley M, for opening the gate, the spring S, for closing the gate when the weight J³ is raised, and the cords N², passing over the said pulleys O' and N, for raising the said weight, substantially as and for the purpose set forth.

ISAAC BURKHOLDER.

Witnesses:
JONAS R. BURKHOLDER,
E. BURKHOLDER.